(No Model.)
P. CLAES.
APPARATUS FOR THE DISTILLATION AND PURIFICATION OF ALCOHOL.
No. 267,836. Patented Nov. 21, 1882.
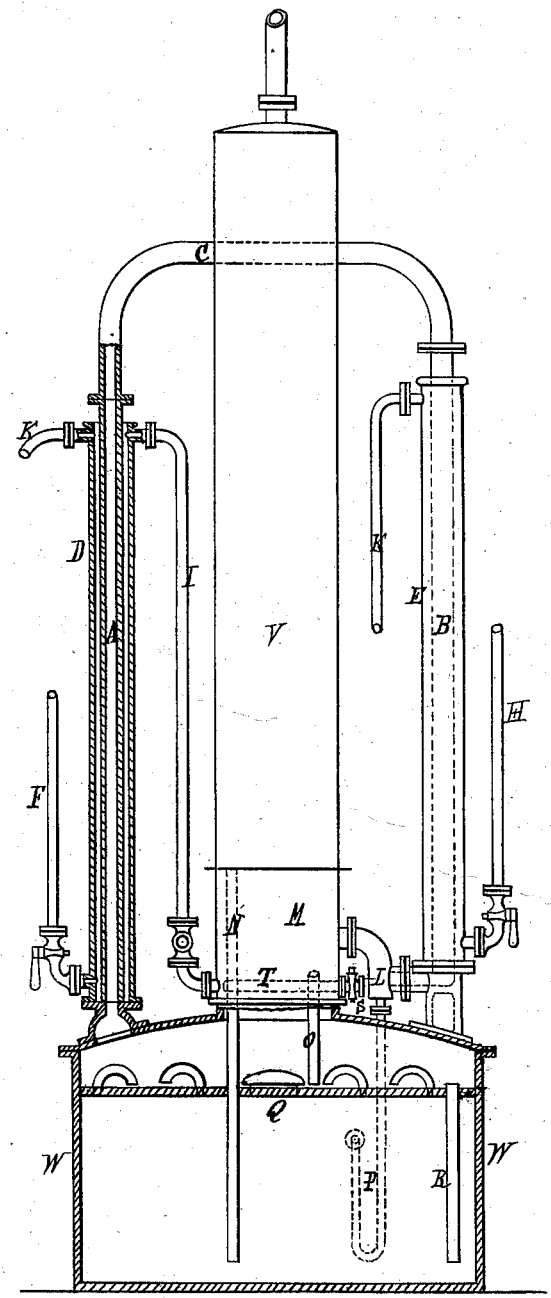

UNITED STATES PATENT OFFICE.

PAUL CLAES, OF BRUSSELS, BELGIUM.

APPARATUS FOR THE DISTILLATION AND PURIFICATION OF ALCOHOL.

SPECIFICATION forming part of Letters Patent No. 267,836, dated November 21, 1882.

Application filed March 6, 1882. (No model.) Patented in Belgium December 5, 1881, No. 56,408, and in France December 9, 1881.

*To all whom it may concern:*

Be it known that I, PAUL CLAES, a subject of the King of Belgium, and residing in Brussels, Belgium, have invented certain Improvements in Apparatus for the Distillation and Purification of Alcohol, (for which I have obtained Belgian Letters Patent dated December 5, 1881, and French Letters Patent dated December 9, 1881,) of which the following is a specification.

The object of my invention is to so construct an apparatus for the distillation and rectifying of alcohol and similar volatile products that it will produce an increased quantity of the purified liquid, while causing the impurities to return directly to the boiler without passing to the column.

In the distillation and rectifying of alcohol it has been usual to employ a boiler or still, in which the material to be treated is maintained at boiling-point in order to convert it into vapors, which rise into the rectifying-column above the boiler. During the operation the vapors are cooled and condensed into liquid form again, those vapors which are lightest and contain the least amount of pure alcohol returning to the boiler by the column, while the others pass to the tester.

With the view of extracting from the mash or other material under treatment all the alcohol contained therein, to eliminate all the impurities, and increase the yield of fine alcohol, I construct and combine with the boiler an apparatus which purifies the alcoholic vapors before they pass to the rectifying-column. This preliminary operation in this apparatus has the effect of causing the vapors containing the impurities to return to the boiler, so that those vapors which pass to the rectifying-column are considerably purified before the practical work of distillation in the column commences, and this operation thus becomes rather a secondary or final one, and supplies alcohol much purer and in greater quantities than by the usual process.

The accompanying drawing illustrates a side view of my improved apparatus, partly in section.

The boiler or still W may be of any of the usual forms, and above this, but having no direct communication therewith in the usual manner, is the rectifying-column V. A steam-chamber, M, separates the lower part of the column from the top of the boiler.

On opposite sides of the column are tubes A and B, communicating with each other through a pipe, C, the lower end of the tube A communicating with the boiler, while the tube B communicates with the steam-chamber M, and through the latter with the rectifying column V. These tubes, with their accessories, constitute the preliminary purifying apparatus or primary condenser, which is the main feature of my invention.

The alcoholic vapors pass from the boiler W first into the tube A, which is inclosed in another tube, D. Into the lower end of this outer tube or jacket D a stream of cold water enters through a pipe, F, which is provided with a cock to regulate the flow. The vapors pass then from the tube A by the tube C into the second part of the apparatus, consisting of a tube, B, also inclosed in an envelope, E, provided with a valved pipe, H, by which water is introduced. The tube A is mounted on and is in immediate connection with the boiler, and receives direct the alcoholic vapors which pass by the tubes C, B, and L into the steam-chamber M, where they are washed by the steam arising from water kept at boiling-point in the chamber. The tube B is also mounted on the boiler, but without any connection therewith. The vapors which are condensed in the tube A return direct to the boiler, and those condensed in the tube B return by the siphon-pipe P placed outside the boiler. The vapors which are condensed in the rectifying column descend into the boiler by the pipe N, one end of which extends nearly to the bottom of the boiler, and the other passes through the steam-chamber M, as shown in the drawing. This chamber is formed in the base of the rectifying-column, and it has no communication with the boiler except by the return or overflow pipe O. This pipe serves to carry off the liquid when it rises to a height above ten or twelve centimeters in the chamber, and convey it onto the plate Q, placed in the boiler, from which the liquid passes to the boiler by another overflow pipe, R. The water heated in the envelopes D E is conveyed to the chamber M by the pipes I K, and it is maintained at boiling point partly by contact with the boiler and partly by means of a coil, T, placed in the bottom of the chamber, and by which steam is introduced into the chamber through a valved pipe, S. The vapors thus generated, mixing with the alcoholic vapors entering by the tubes A, C, B, and L, complete the purification of the alcoholic vapors, which then rise to the upper part of the rectifying-column. The steam-chamber M can be provided with a water-gage, if desired. The water intended for the purification of the alcoholic vapors is drawn from a suitable reservoir by the pipes H and F into the enveloping-tubes D and E in quantities sufficient to maintain therein the desired temperature, which can be determined by a thermometer fixed at about half their height upon each of the tubes D and E.

It will be evident that instead of the single tubes A and B, I may use two, three, or more tubes of condensation of any suitable form, and inclosed in suitable enveloping-tubes through which cold water is caused to constantly pass, as above described.

I am aware that stills have heretofore been provided with condensing devices between the still and rectifying-column. My invention consists in an improved construction of condensing-tubes, still, and column, whereby I obtain a compact arrangement of the different parts while giving an extended condensing-surface.

I claim as my invention—

1. The combination of a still and a rectifying-column with a tube, A, leading from the still, tube B, communicating with the lower end of the column, and a pipe connecting the two tubes, which are inclosed in water-tubes, the column and tubes A B being mounted on the still, all substantially as described.

2. The combination of a still and a rectifying-column having a steam-chamber at its lower end with water-envelopes D E and the condensing tubes and pipes I K, forming a communication between the envelopes and the said steam-chamber.

In testimony whereof I have signed my name to this specification in the presence of two subscribing witnesses.

PAUL CLAES.

Witnesses:
  AUG. FORRISSEN,
  FRANÇOIS DE BRUYN.